(12) United States Patent
Mackay

(10) Patent No.: US 9,727,909 B2
(45) Date of Patent: Aug. 8, 2017

(54) ANONYMOUS BLOCK TRADE MATCHING SYSTEM

(75) Inventor: Anthony Mackay, Surrey (GB)

(73) Assignee: INSTINET EUROPE LIMITED, London (GB)

( * ) Notice: Subject to any disclaimer, the term of this patent is extended or adjusted under 35 U.S.C. 154(b) by 1127 days.

(21) Appl. No.: 12/769,049

(22) Filed: Apr. 28, 2010

(65) Prior Publication Data

US 2010/0293085 A1 Nov. 18, 2010

Related U.S. Application Data

(62) Division of application No. 11/799,609, filed on May 1, 2007.

(51) Int. Cl.
*G06Q 40/00* (2012.01)
*G06Q 30/08* (2012.01)
*G06Q 40/04* (2012.01)

(52) U.S. Cl.
CPC .............. *G06Q 30/08* (2013.01); *G06Q 40/04* (2013.01)

(58) Field of Classification Search
CPC ......... G06Q 40/00; G06Q 40/04; G06Q 30/08
USPC .............................. 705/37, 36 R, 35, 38, 26.1
See application file for complete search history.

(56) References Cited

U.S. PATENT DOCUMENTS

| | | | |
|---|---|---|---|
| 7,565,313 B2 * | 7/2009 | Waelbroeck et al. | 705/37 |
| 2004/0034591 A1 * | 2/2004 | Waelbroeck et al. | 705/37 |
| 2004/0111356 A1 * | 6/2004 | Srivastava et al. | 705/37 |
| 2008/0015965 A1 * | 1/2008 | Huang et al. | 705/37 |
| 2009/0281954 A1 * | 11/2009 | Waelbroeck et al. | 705/80 |

FOREIGN PATENT DOCUMENTS

| | | |
|---|---|---|
| JP | 2002149981 | 5/2002 |
| KR | 1019990008095 | 1/1999 |
| KR | 10-2005-0097327 | 10/2005 |
| WO | WO 96/34357 | 10/1996 |
| WO | WO 98/41942 | 9/1998 |

(Continued)

OTHER PUBLICATIONS

Roti, Steve "Using PL/SQL. (structured query language) (Desktop Oracle) (column)" Apr. 1, 1991 DBMS, v4, n4, p22(2).

(Continued)

*Primary Examiner* — Kelly Campen
(74) *Attorney, Agent, or Firm* — Tarter Krinsky & Drogin LLP

(57) ABSTRACT

An anonymous block trade matching system which allows users that who wish to cross large blocks of stock to submit orders, or indications of interest, with the option of utilizing market peg benchmarks or future price cross benchmarks. Orders submitted may be subject to minimum thresholds, including a threshold requiring that the order represent 'X' % of average daily volume. After submission of a firm order in the system, an alert is generated to provide the order data to other users with potential to cross the order. Visibility of order data by other users may be restricted based upon a data interaction group to which the ordering user or the other user belongs. The system provides users viewing order data with a capability of communicating with the submitting user via a restricted two-way messaging interface.

5 Claims, 5 Drawing Sheets

(56) References Cited

FOREIGN PATENT DOCUMENTS

WO    WO 02/054321    7/2002

OTHER PUBLICATIONS

Anonymous "Q4 2005 Investment Technology Group Earnings Conference Call—Final" Feb. 1, 2006 Fair Disclosure Wire pp: n/a.
Shi et al. "Regroup-And-Go mixes to counter the (n-1) attack" 2006 Internet Research v16n2 pp. 213-223.
http://blog.naver.com/figaro9/6681421, (English Language version unavailable).

* cited by examiner

ANONYMOUS BLOCK TRADE MATCHING SYSTEM

This application is a divisional of U.S. patent application Ser. No. 11/799,609, filed May 1, 2007.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of computer systems, and in particular to a novel computer system for facilitating block trade securities transactions.

BACKGROUND OF THE INVENTION

Block trading, also referred to as "crossing," is a well-known type of securities transaction wherein trades are privately negotiated apart from the public auction market. Block trading allows sell side traders and buy-side traders to reduce transaction costs, such as ticket, execution and settlement costs. While block trading is most often performed through manual negotiation, several matching engines and alternative trading systems have been known in the prior art for matching securities buyers with sellers and for matching securities sellers with pools of liquidity.

Some such matching engines, previously known as Instinet, VT and CBX (the "Instinet Systems"), provided by Instinet, allow users to submit anonymous orders. The systems distribute order alerts to other users of the system who may have interest in performing a transaction with the user whose order triggered the order alerts. When order alerts are distributed and negotiated upon between parties, the parties are anonymous to each other. In this respect, order alerts allow parties to seek a natural counterpart to trade with while controlling information leakage and protecting trading strategy.

Users of such systems control what order information the market sees, showing externally only a minimum execution size and price, while negotiating actual size and price with natural counterparties.

However the Instinet Systems and other matching engines which provide for block trading are limited in several respects. While they have provided a means for continuous off-exchange crossing, they have not provided a sufficient capability to submit orders using market peg benchmarks or future price cross benchmarks via a web based terminal application. While such systems have provided a means for transmitting alerts to subscribers to advise them of potential trading opportunities, no means has existed for permitting the user to control which users or types of users will receive such alerts. Additionally, systems that provide for block trading have typically provided only limited means for negotiation between the parties, and such negotiations were only available to customers utilizing proprietary trading platforms on a proprietary data network.

OBJECTS AND SUMMARY OF THE INVENTION

It is therefore an object of the invention to provide an improved anonymous block trade matching system.

It is a further object of the invention to provide a system which enables participants to cross large blocks of international or national stocks anonymously to cut ticket, execution and settlement costs while also reducing market impact and spread costs.

In preferred embodiments, the invention provides an anonymous block trade matching system which allows users that wish to cross large blocks of stock to submit orders, or indications of interest, with the option of utilizing market peg benchmarks or future price cross benchmarks. Orders submitted may be subject to minimum size thresholds. After submission of a firm order in the system, an alert is generated to provide the order data to other users with potential to cross the order. Visibility of order data by other users may be restricted based upon a data interaction group to which the ordering user or the other user belongs. The system may provide users viewing order data with a capability of negotiating with the submitting user via a restricted two-way messaging interface. Flat rate and rebate/fee cost models may be utilized as a means for charging a user for access to the system.

The invention therefore provides a mutually beneficial trading solution where both trade parties can benefit from trading directly with a natural counterpart.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 2a shows a graphical illustration of an interface by which the system receives an order in accordance with one embodiment.

FIG. 2b shows a graphical illustration of an interface by which the system receives an order in accordance with an embodiment.

FIG. 4 shows a graphical illustration of a web application interface in accordance with one embodiment.

FIG. 5 shows a graphical illustration of a two-way messaging system interface.

FIG. 6 shows a graphical illustration of a search window in accordance with one embodiment of the invention.

DETAILED DESCRIPTION OF THE PREFERRED EMBODIMENT

Reference will now be made in detail to the preferred embodiments of the present invention, examples of which are illustrated in the accompanying drawings.

The present invention is described below with reference to block diagrams and operational illustrations of methods and devices to make and use a block trade matching system in accordance with the invention. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
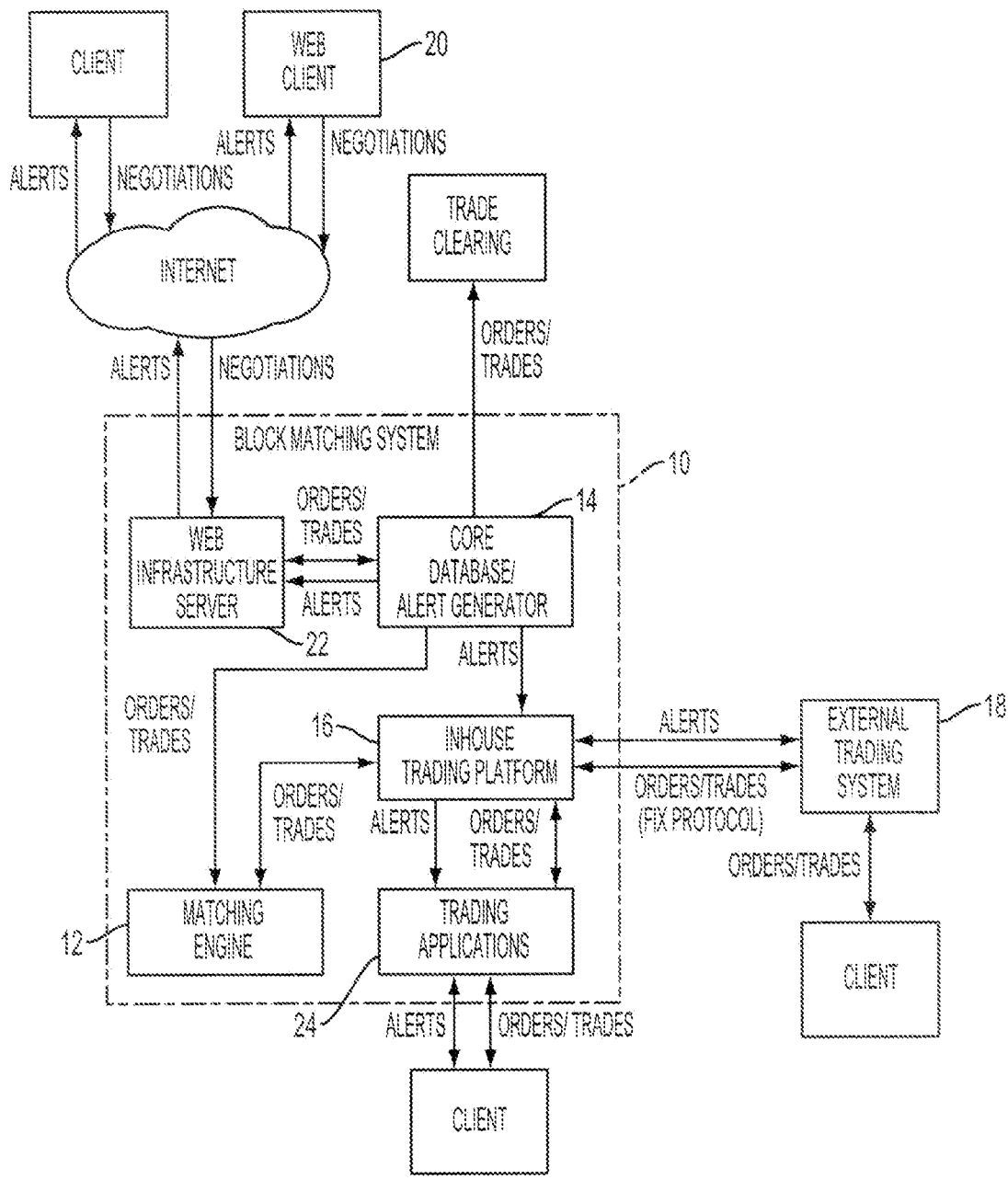
FIG. 1 shows a schematic block diagram illustrating a system in accordance with an embodiment of the invention.

FIG. 1 illustrates an embodiment of the disclosed anonymous trade-matching system 10 for trading natural large blocks of stock across international or national markets. The system 10 provides users with the ability, during continuous trading hours, to submit orders for block trades. When a firm order is placed, order data for the order may be included in a block match "alert", or "indication of interest (IOI)", which is selectively distributed to other users to alert such users to the opportunity to enter into a cross trade.

A block matching engine 12 utilizes algorithms, discussed further below, to match orders. A core database 14 is provided for storing historical information regarding trades and tracking the trading history of clients. In one embodiment the core database is the generator of alerts. However, as will be understood by those of ordinary skill in the art, alerts may be generated by any server in the system without departing from the spirit and scope of the invention. Clients may access the trade-matching system 10 to place orders and/or receive alerts via an interface with an inhouse trading application 24 that communicates with an inhouse trading platform 16, via an interface with an external trading system 18 that communicates with inhouse trading platform 16, or via a web client 20 that connects via the internet with a web infrastructure server 22.

The external trading system 18 may communicate with the trade-matching system 10 using a suitable standard or proprietary order protocol. One example of a suitable protocol is the Financial Information eXchange (FIX) protocol published by FIX Protocol maintained by FIX Protocol Ltd of London, U.K. The FIX protocol is a well-known electronic communications protocol for international real-time exchange of information related to the securities transactions and markets. FIX messages are formed from a number of fields, each field is a tag value pairing that is separated from the next field by a delimiter SOH. The TAG is a string representation of an integer that indicates the meaning of the field. The value is an array of bytes that hold a specific meaning for the particular TAG. For example, "TAG 48" is securityID and is a string that identifies the security, "TAG 22" is IDSource and is an integer that indicates the identifier class being used. In the main the value is readable text. However, fields can be encrypted and thus the value can be pure binary and include the normal delimiter SOH—binary fields are always preceded by a length field. The FIX protocol defines meanings for most TAGs and a range of TAGs is reserved for private use between consenting parties. The FIX protocol also defines sets of fields that make up a particular message. Within the set of fields some are mandatory under the protocol and others are optional.

The web infrastructure server 22 provides a secure interface to web clients accessing the system over the interne, and sets user level permissions. The web client 20 runs an internet-delivered web application that allows users to view trading opportunities in the form of "alerts," which are discussed in further detail below. The web application may additionally provide the user with an ability to set up filters to prevent their receipt of an overwhelming number of alerts for market sectors in which such user is not interested. The web application may also include instant messaging functionality for allowing clients to communicate with each other using permitted phrases in furtherance of negotiating a trade, as is discussed in further detail below. The Web application may further incorporate an advanced search screen that allows users to input criteria of their choice to display orders that are placed with the system. The web application in one embodiment establishes a real time data feed from core database so that changes made in core database intraday will be reflected instantly in the web front end. The presentation of the data by the web application may be accomplished by configuring it to display four types of windows: a stock list window displaying an order-by-order list of live, traded, cancelled and expired orders on the system; a market depth window showing consolidated data by price for live, traded, cancelled and expired orders, an alert window displaying IOI's relating to orders placed in the system, and a two-way message window used for negotiating with participants on existing orders, expired/cancelled orders and traded orders.

Figures 2A, 2B:
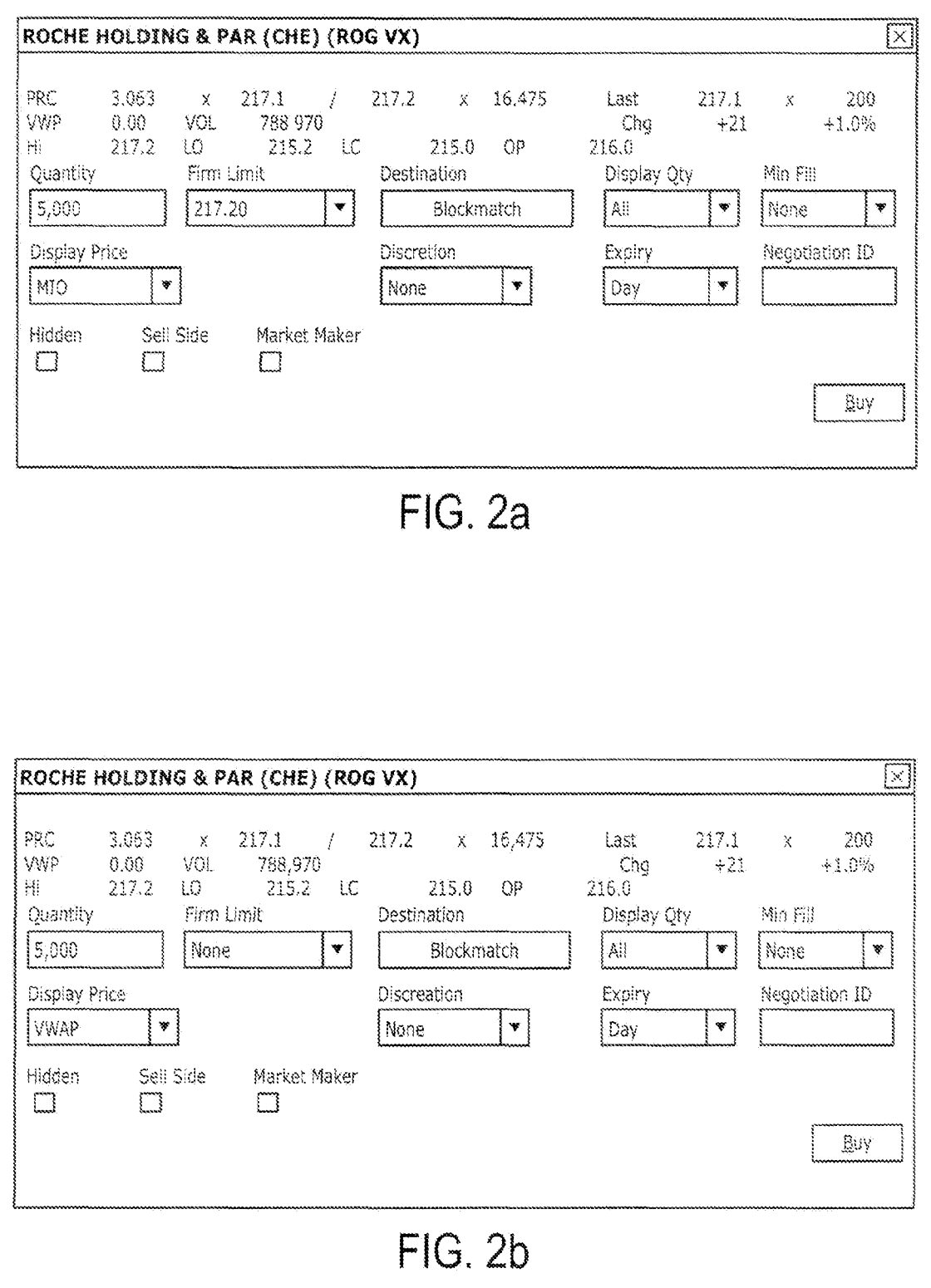

FIGS. 2a and 2b show graphical illustrations of an interface by which the system receives a securities order in accordance with one embodiment. Current market data for a security is displayed in the top third of the interface. In the center of the interface is a series of fields with selection options. A "Quantity" field allows the user to specify a quantity associated with the order. A "Display Quantity" field provides a combo control to allow a user to specify display quantity, subject to minimum display criteria, with the option to select system values using a drop down. Such system values may be, e.g., "1000," "2000," "3000," "4000," "5000," "10000," "15000," "20000," or "25000." The default value may be set as "All", in which case the entire order will be displayed. An "Expiry" field provides a combo control to allow a user to specify an expiry time for the order. Users can access a list of system values using the drop down. Such system values may be, e.g., "Day," "GTD," "Blotter," "+5 mins," "+10 mins," "+1 hr," or "IOC." The default value required may be set to "Day".

The order screen of FIGS. 2a and 2b in one embodiment includes a "Display Price" field which prompts the user to select a benchmark in connection with the order. Orders may be submitted using, e.g., market peg benchmarks 'Mid', 'Bid' and 'Ask', and future price cross benchmarks 'VWAP', 'Open' and 'Close'. By providing the ability to submit orders using these benchmarks during continuous trading hours, the system can offer a mutually beneficial trading solution where both trade parties can benefit from trading directly with a natural counterpart, and can thus provide a means for cutting ticket, execution and settlement costs by eliminating the middleman while also reducing market impact and spread costs.

If the user specifies a primary peg benchmark (e.g., 'Mid', 'Bid' or 'Ask) in the "Display Price" field of FIGS. 2a and 2b, the system provides the option of adding a hard limit to the order. In such case, the primary peg benchmark price moves as the market moves, but the user is ultimately protected by their hard limit should the market move beyond their upper limit price. The order will be displayed using the alphabetic peg benchmark value, e.g., MID, and not the actual price value. If the market moves beyond the user's hard limit, the order type will change to a hard limit order automatically and will then display the hard limit price in numeric format. If the market moves favorably again, the order will again revert to an alphabetic value. When a match (person entering order for opposite side at same benchmark value) is found, trades will be issued at the primary price of the specified benchmark at the time the match occurred.

If the user specifies a primary future cross price benchmark value, e.g. 'VWAP', 'Open' or 'Close', in the "Display Price" field of FIGS. 2a and 2b, no option is given to specify a hard limit. The order will be set at the chosen benchmark, and upon finding a match—a person entering an order for opposite side at same benchmark value—an indicative fill will be sent to both participants at the primary market last close price. When the Primary Exchange publishes its official price that the user specified as their future cross benchmark, trade corrects will be sent to both participants at the official cross price.

The system may be configured to require a user entering an order to adhere to one or more minimum thresholds, on a per-stock basis, in order to participate in the block matching functions provided by the system. Such thresholds include a "% ADV" threshold and a Share Quantity threshold. To meet the % ADV threshold, an order must represent 'X' % of Average Daily Volume. To meet the Share Quantity threshold, an order must be 'X' number of shares. If an order not meeting a required threshold is entered in the system, it may be rejected by the system. Thresholds for a particular stock ordered may be set at any value, but will generally be based on liquidity of the stock and price level of the stock ordered.

The system may further be configured to provide users with the facility to include their order data on block match alerts, or indications of interest (IOI's), maximizing the potential to find a suitable party to cross with. The system in various embodiments segregates users into four distinct data interaction groups, and makes order data visible to users in accordance with the group to which they belong. In one embodiment, the four groupings are: Buy Side, Sell Side, Market Maker and Dark Provider. The constituency of these groups, and the extent to which they are able to view orders in the system, is summarized in the table below:

| Group | Type | Visibility |
| --- | --- | --- |
| Buy Side | Institutions Typical Hedge Funds | Full visibility of Buy and Sell side orders. No visibility of Dark orders. |
| Sell Side | Broker/Dealer Prop Desks | Restricted - at discretion of participant posting liquidity |
| Market Maker | Market Maker | Restricted - at discretion of participant posting liquidity |
| Dark Providers | Participants that do not want any visibility of their orders | Zero visibility of orders from all groups. |

Figure 3:
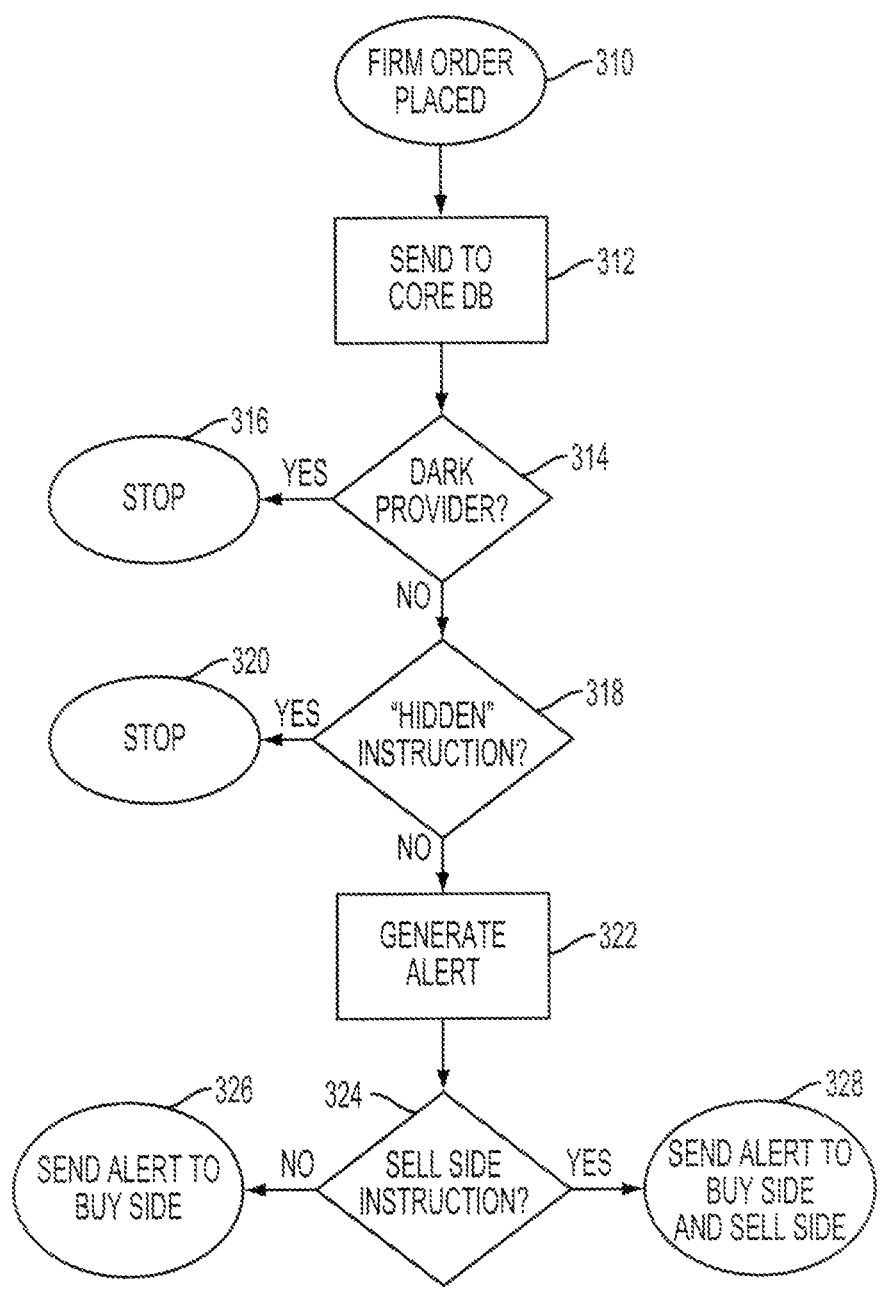
FIG. 3 is a high-level functional flow diagram illustrating a process for generating and distributing alerts.

FIG. 3 is a high-level functional flow diagram illustrating a process for generating and distributing alerts. The process begins at step 310 with the receipt of a firm order in the system. Users must enter a firm order into the block matching system in order to trigger an alert/IOI. The order data is first sent to the core database at step 312. At step 314, the order data is examined to determine if the user placing the order has designated himself as a dark provider. Dark Providers will never see any order data for orders placed in the block matching system, but instead are able to interact with orders as a blind participant. Their orders are not visible to any of the participating groups. Thus, if the user placing the order is a dark provider, no alert is generated and the alert generation process is stopped at step 316. Otherwise, the process continues to step 318. At step 318, the order data is examined to determine whether the user has added a "hidden" instruction to the order. If a user adds a "Hidden" instruction when placing an order, the order will not be displayed in the order book and no alert will be generated.

If the order is not designated as hidden and is not placed by a dark provider, the process proceeds to generate an alert at step 322. The content of such alert is discussed below with reference to FIG. 4. With continued reference to FIG. 3, the order data is then examined to determine whether the user has included therein a sell side instruction. In accordance with one embodiment, orders placed in the system are only visible to buy side users by default. Buy side users, however, have the option to make their orders visible to the sell side/makers makers by adding a "sell side" instruction to their order. Such sell side instruction may be indicated at the time of the order, e.g., by checking a "sell side" box shown in FIGS. 2a and 2b. Alternatively, such instruction may be set automatically by the system in accordance with a user's user profile. Sell side users are able to enter orders into the system, but their orders will always be visible to the Buy Side. They are, however, able to hide orders from other sell side/market maker users by not adding the 'Sell Side' instruction to their order.

Based upon a user's trade history data stored in the core database 14 (FIG. 1), and specifically the volume of trades which the particular user has conducted within a specified historical time frame (e.g., the past one month, past four months, past six months, etc.) a particular client may be assigned a "tier." As an incentive for using the system, the system may be configured to provide higher tiered clients, e.g., those with a higher volume of trades historically, with alerts in advance of lower tiered clients. In one embodiment, there are two tiers of users, tier one and tier two. Tier one users receive alerts ahead of tier two users and other participants. In one embodiment, the system is configured to transmit alerts to tier one users one minute ahead of tier two users. The system may be configured to require users to have met a preset minimum volume of trades within a specified time period to be eligible for tier one alerts. For example, users may be required to have traded on the system at least once in the last week. Alert subscriptions are checked by the system when a new order is placed in the system to determine which users will receive the alert first. The system may be configured such that tier one alerts are only available through inhouse front ends, and all external alert subscribers are assigned to tier two.

Figure 4:
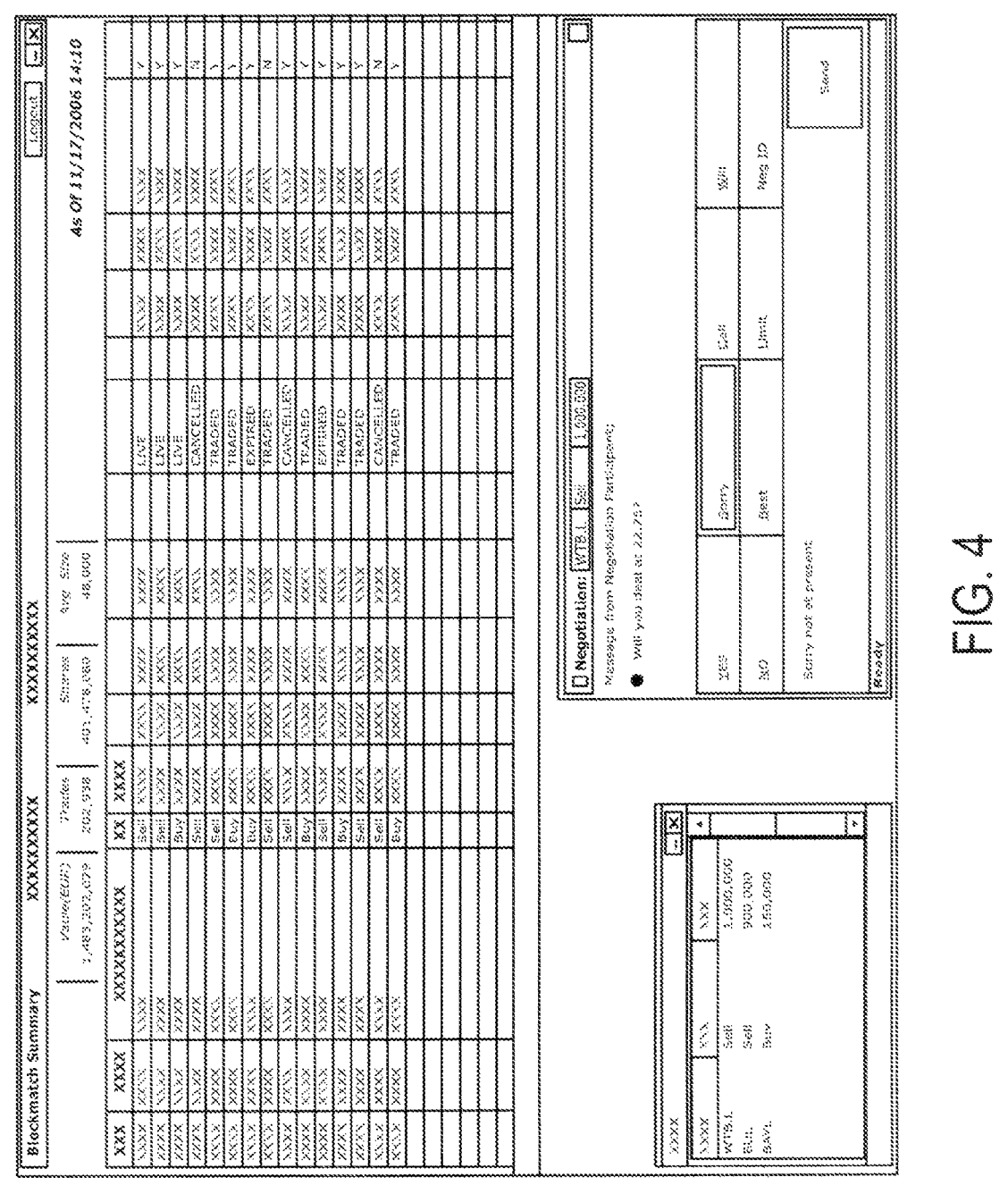

FIG. 4 shows a graphical illustration showing an example of a web application interface, including an alert window, a stock list window, and a negotiation window, in accordance with one embodiment. In accordance with one embodiment, the alert window displays alerts/IOIs for orders as and when they placed in the system, subject to the user's tier target level and client group (e.g., buy side, sell side, or dark provider) visibility. The window may be set as a permanent display window by default. However, the system may be configured to provide users with the ability to right click, for example, on the window and select 'set as pop-up window' if they prefer the window to open upon receipt of a new alert. The alert window displays the Stock, Side and Qty for each new alert/IOI. The system may be configured to cause an alert/IOI to expire and be cleared from the alert window after a predetermined period of time, e.g., two minutes.

As shown in FIG. 4, a stock list window may be provided in the web application interface for viewing and interacting with current and historical order data. The interface allows users who have a subscription to view order data for orders placed in the system to see live orders as well as traded, cancelled and expired order history over a specified amount of time, e.g., over the last thirty days. Each order may be presented on a separate line, with lines sorted such that live orders appear at the top, sorted by date and time, followed by traded, cancelled, and expired order history, which are each also sorted by date and time. The system may be configured such that when a new live order is added to the system for a stock that is displayed in a user's stock list window, the line for the order is displayed in a distinct colour which gradually fades over a period of time, e.g., two minutes, to reveal the underlying row colour for the order.

Figures 5, 6:
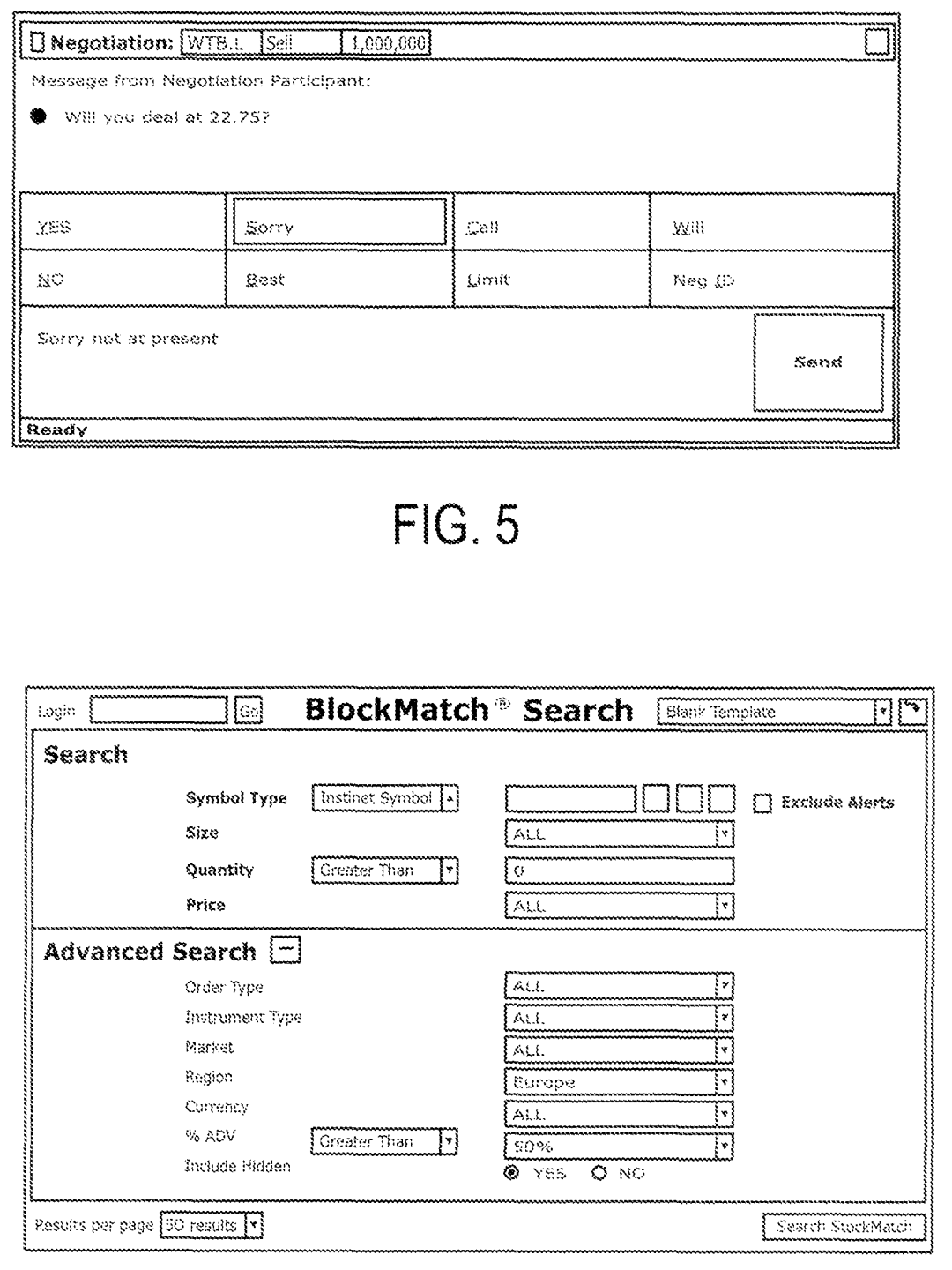

Negotiation on historic order data, as well as live orders, is provided via a two-way messaging system that is activated, e.g., via double-clicking on a particular order displayed in the stock list window or the alert window shown in FIG. 4, or by activating a button or other control associated with the order in such windows. FIG. 5 shows a graphical illustration of a two-way messaging system interface. The two-way messaging system may be provided as a real-time messaging system, e.g., instant messaging, or may be provided as a non-real-time messaging system such as an e-mail system. The two-way messaging system may be provided as part of the web application running on web client 20 (FIG. 1).

Users can use the two-way messaging interface of FIG. 5 to target an order of interest and strike up a restricted message with the owner of the historic order using predetermined hard-coded phrases permitted by the system through restricted keystrokes or button presses. Keyboard stickers may be provided to users to associate particular keys with particular permitted phrases. For example, the "S" key may be associated with the phrase "Sorry not at present" and the "W" key may be associated with the phrase "Will you deal at." The hard-coded phrases may similarly be implemented in the form of a series of phrases associated with a corresponding series of soft buttons appearing on the interface of FIG. 5. In such embodiments, the system limits the parties to communications using a finite number of phrases associated with a finite number of corresponding buttons, as well as the number keys on the user's keyboard. Numeric keys are preferably not restricted.

Below is an exemplary list of the messages permitted from the negotiation window using soft buttons (e.g. Sorry) activated by the mouse or hot keys (e.g. W) activated by the keyboard:

| Button label | Full text message | Keyboard Hot Key |
| --- | --- | --- |
| Yes: | Yes | Y |
| No: | No | N |
| Will: | Will you deal at _? | W |
| Sorry: | Sorry, not at present | S |
| Best: | My best price is _ | B |

-continued

| Button label | Full text message | Keyboard Hot Key |
| --- | --- | --- |
| Call: | Need to make a call, be right back | C |
| Limit: | Currently limited at _ | L |
| NegID: | Requests a negotiation ID | I |

The negotiation window of FIG. 5 depicts a negotiation between two participants. The first participant has sent a message 'will you deal at 22.75?' to the owner of order WTB.L, Sell, 1,000,000. The order owner is about to respond with 'Sorry not at present'.

When a negotiation has been agreed upon in terms of price or size, users may request a system-generated negotiation ID that can be attached to a firm order to lock the order from trading with anyone other than their negotiation partner. This ID may be system generated by the web application and visible to both users. Both users submit an order with their agreed order parameters (size, price), adding the negotiation ID to their order in a negotiation text field. This effectively locks the order for the two participants and prevents the user's order from crossing with any party other than the one with which they have been negotiating. The completed order is cleared via external trade clearing (FIG. 1).

FIG. 6 shows an example of an advanced search window in accordance with one embodiment of the invention that allows a user to input criteria of their choice to display orders that have been placed with the system. Once logged in to the web application, a user is presented with the search window. The user can utilize this window to build queries on an ad hoc basis, or he can set up his preferred search criteria and save the query so that on subsequent log ins all that is required of him is to select the query name and select a "Go" button or similar control.

In the search window of FIG. 6, a "Symbol" fields provides a means for a user to identify a specific stock, to identify multiple stocks using a comma separator, or select one or more stocks from a list. A "Symbol Type" field allows the user to identify the type of symbol entered in the Symbol field, e.g., "Instinet Symbol," "RIC," Cusip," "Sedol" and references to third party vendor products, such as Bloomberg. An "Exclude Alerts" field provides the user with the capability of excluding from the search results those orders for which an alert has been generated. A "Side" field provides a drop-down list allowing a user to limit the search to either buy-side or sell-side orders. An "Order. Type" field allows the user to limit the search to orders that are either live, traded, cancelled or expired. A "Quantity" field provides a means for the user to specify a range, e.g., 10,000-20,000. An "Instrument Type" field allows the user to specify a type of instrument to search for, e.g., UKE, ITE, USE, USEO, or CAE. A "Market" field allows the user to restrict his search to a particular market, e.g., U.K. or U.S.A "Region" field similarly allows the user to restrict his search to a particular region, e.g., Europe, US, or Asia, or to multiple regions using a comma separator. A "Currency" field allows the user to restrict the search to orders in a particular currency, e.g., GBP, GBp, USD, JPY, HKD, EUR, CHE, NOK, DKK, ZAR, or All. A "% ADV" field allows the user to specify a range, e.g., between 5% and 200%, for the percentage of order quantity that is for the specified stock. An "Include Hidden" field allows the user to include in the search results orders which were placed with the "Hidden" instruction discussed above. A "Search BlockMatch" button causes the query to execute with the above criteria, and returns a list of orders in the system that matches such criteria.

The system may be configured to provide users with a mutually beneficial cost model for two parties that wish to cross large blocks of stock off-exchange. In this respect, the system may provide two cost model options for users—a flat rate cost model and a rebate/fee cost model.

The flat rate cost model option offers users who want a flat rate cost model with access to the system at a flat rate cost per trade, e.g., 2.5 bp per trade on DMA orders or orders placed with the system through a representative of the system proprietor. Orders that are placed with the system using one of several value-adding algorithms that automate the accessing of liquidity may be offered at another, higher flat rate, e.g., 3 or 4 bp.

The rebate/fee cost model option provides users with the ability to conduct a transaction where the buying supplier gets a net price of, e.g., 10 minus 2.5 bp and the seller gets a net price of, e.g., 10 minus 7.5 bp. To accommodate the rebate/fee model is configured to automatically calculate client trades as a fee or rebate on a per-trade basis based on which client was the provider or taker of liquidity. Alternatively the system can be configured to allow all trades to be processed under a flat rate model and then at the end of the day or month manually override each rate with the new rate after all rebates/fees have been taken into account.

Thus, the system may be configured to offer participants that post directly to it the ability to 'take liquidity' at a flat rate, e.g. 7.5 bp, while 'liquidity providers' benefit from a rebate, e.g. 2.5 b, on orders. The system may be further configured such that participants that trade roughly an equal proportion of posting and taking liquidity can access the system at a flat rate, such as the mid point of the gross commission, for direct posting and taking liquidity, e.g. 2.5 bp, on all trades.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. An anonymous block trade matching system, comprising:
    a server configured to receive order data for an order of a security by a first user;
    a core database having stored therein said order data;
    an alert generator configured to use said order data to transmit to at least a second user an alert anonymously describing said order; and
    a two-way messaging interface that enables said second user to initiate a negotiation communication between said first user and said second user, said two-way messaging interface restricting said communication from at least one of said first user and said second user to a finite set of phrases.

2. The anonymous block trade matching system in accordance with claim 1, wherein said two-way messaging interface is configured to restrict communication from both said first user and said second user to said finite set of phrases.

3. The anonymous block trade matching system in accordance with claim 1, wherein said two-way messaging interface is configured to translate a keystroke by one of said first or second user into a negotiating phrase that is displayed to the other of said first or second user.

4. The anonymous block trade matching system in accordance with claim 1, wherein said two-way messaging interface is configured to translate a soft button press or mouse click by one of said first or second user into a negotiating phrase that is displayed to the other of said first or second user.

5. The anonymous block trade matching system in accordance with claim 1, wherein the system is configured such that when a negotiation has been agreed upon between said first user and said second user using said two-way messaging interface, the system generates a negotiation ID that is attached to said order data and locks the order from trading with any party other than said first user and said second user.

* * * * *